United States Patent
Wei (10) Patent No.: US 10,140,898 B2
(45) Date of Patent: Nov. 27, 2018

(54) MULTI-VIEW DISPLAY DEVICE AND METHOD FOR DRIVING THE SAME

(71) Applicant: BOE TECHNOLOGY GROUP CO., LTD., Beijing (CN)

(72) Inventor: Wei Wei, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 105 days.

(21) Appl. No.: 15/118,685

(22) PCT Filed: Jan. 6, 2016

(86) PCT No.: PCT/CN2016/070237
§ 371 (c)(1),
(2) Date: Aug. 12, 2016

(87) PCT Pub. No.: WO2017/016194
PCT Pub. Date: Feb. 2, 2017

(65) Prior Publication Data
US 2017/0154555 A1    Jun. 1, 2017

(30) Foreign Application Priority Data
Jul. 30, 2015    (CN) .......................... 2015 1 0459615

(51) Int. Cl.
*G09G 3/00* (2006.01)
*G02F 1/1343* (2006.01)
(Continued)

(52) U.S. Cl.
CPC ............. *G09G 3/003* (2013.01); *G02B 27/22* (2013.01); *G02F 1/134336* (2013.01);
(Continued)

(58) Field of Classification Search
None
See application file for complete search history.

(56) References Cited

U.S. PATENT DOCUMENTS

| 2002/0070909 A1* | 6/2002 | Asano ................. G09G 3/3233 345/76 |
| 2016/0219271 A1 | 7/2016 | Wei |
| 2016/0240593 A1* | 8/2016 | Gu ....................... G09G 3/3225 |

FOREIGN PATENT DOCUMENTS

| CN | 103809293 | 5/2014 |
| CN | 104297962 A | 1/2015 |

(Continued)

OTHER PUBLICATIONS

PCT Search Report and Written Opinion dated Apr. 25, 2016, Application No. PCT/CN2016/070237, 13 Pages.
(Continued)

*Primary Examiner* — Christopher J Kohlman
(74) *Attorney, Agent, or Firm* — Brooks Kushman P.C.

(57) ABSTRACT

A multi-view display device and a method for driving the same are provided. The multi-view display device includes a display panel and an optical grating. The display panel includes an array of a plurality of sub-pixels, and the sub-pixels in different columns, which are adjacent to each other in a row direction, are of different colors and staggered in a column direction. The array includes a plurality of pixel units, and each of the pixel units includes at least one sub-pixel in each of three adjacent columns of the sub-pixels. In each pixel unit, a middle column includes more sub-pixels than each of two side columns, amounts of the sub-pixels in the two side columns are identical, and the middle column includes one more sub-pixel than each of the two side columns. The optical grating includes a light-transmitting region corresponding to a central region of the middle column in each pixel unit.

16 Claims, 4 Drawing Sheets

(51) Int. Cl.
*G09G 3/20* (2006.01)
*G09G 3/36* (2006.01)
*G02B 27/22* (2018.01)

(52) U.S. Cl.
CPC ......... *G09G 3/2003* (2013.01); *G09G 3/2074* (2013.01); *G09G 3/3607* (2013.01); *G09G 3/3611* (2013.01); *G02F 2001/134345* (2013.01); *G02F 2201/52* (2013.01); *G09G 2300/0426* (2013.01); *G09G 2300/0452* (2013.01); *G09G 2320/0626* (2013.01)

(56) References Cited

FOREIGN PATENT DOCUMENTS

| | | | |
|---|---|---|---|
| CN | 104503116 A | | 4/2015 |
| CN | 104517541 A | | 4/2015 |
| CN | 104978941 A | | 10/2015 |
| WO | 2008110991 A1 | | 9/2008 |
| WO | WO2008/110991 | * | 9/2008 |

OTHER PUBLICATIONS

English Translation to Written Opinion of The International Searching Authority for PCT/CN2016/070237, dated Apr. 25, 2016, 3 Pages.
English Translation attached to the Chinese Office Action for Chinese Application No. CN 201510459615.5, Completed by the Chinese Patent Office, dated Jul. 4, 2016, All together 13 Pages.

* cited by examiner

MULTI-VIEW DISPLAY DEVICE AND METHOD FOR DRIVING THE SAME

CROSS-REFERENCE TO RELATED APPLICATION

This application is the U.S. national phase of PCT Application No. PCT/CN2016/070237 filed on Jan. 6, 2016, which claims priority to Chinese Patent Application No. 201510459615.5 filed on Jul. 30, 2015, the disclosures of which are incorporated in their entirety by reference herein.

TECHNICAL FIELD

The present disclosure relates to the field of liquid crystal display technology, and in particular to a multi-view display device and a method for driving the same.

BACKGROUND

Along with the development of the display technology, the display technology of displaying different images at two sides (e.g., left and right sides) of a display screen is applied more and more widely. The display device applying the above display technology is a dual-field display device. The dual-field display is able to better meet the requirements of the user for experiencing the rapidly developing display technology, and also enables the user to obtain different display information from one display screen.

Along with a further development of the display technology, the dual-field or the multi-field display will become more and more desired by the users.

SUMMARY

In view of this, a multi-view display device and a method for driving the same are provided, so as to achieve a multi-view display.

To achieve the above objective, a multi-view display device is provided, including a display panel and an optical grating. The display panel includes an array of a plurality of sub-pixels, and the sub-pixels in different columns, which are adjacent to each other in a row direction, are of different colors and staggered in a column direction. The array includes a plurality of pixel units, and each of the pixel units includes at least one sub-pixel in each of three adjacent columns of the sub-pixels. In each pixel unit, a middle column includes more sub-pixels than each of the two side columns, amounts of the sub-pixels in the two side columns are identical, and the middle column includes one more sub-pixel than each of the two side columns. The optical grating includes a light-transmitting region corresponding to a central region of the middle column in each pixel unit.

Optionally, the multi-view display device further includes a light-transmitting layer between the display panel and the optical grating.

Optionally, the middle column in each pixel unit includes at least three sub-pixels, and the central region of the middle column is a region corresponding to the sub-pixel between the sub-pixels at two ends of the middle column. A size of the light-transmitting region of the optical grating is adapted to a total size of the sub-pixel in the central region of the middle column in each pixel unit.

Optionally, the middle column in each pixel unit includes two sub-pixels, and the central region of the middle column includes a part of each of the two sub-pixels in the middle column which is near to a center of the middle column, an area of the central region is smaller than an area of one sub-pixel. A size of the light-transmitting region of the optical grating is adapted to a total size of the sub-pixels in the central region of the middle column in each pixel unit.

Optionally, the optical grating is a barrier optical grating, an active barrier optical grating, a lenticular optical grating or an electronic light control optical grating.

Optionally, the sub-pixels in different columns, which are adjacent to each other in the row direction, are staggered in the column direction by two thirds to one third of one sub-pixel.

Optionally, arrangements of the sub-pixels in odd-numbered columns are identical to each other and arrangements of the sub-pixels in even-numbered columns are identical to each other in the array of the sub-pixels.

Optionally, the light-transmitting region is rectangular, and a size thereof is adapted to a size of the sub-pixel in the central region of the middle column in each pixel unit.

Optionally, the optical grating is arranged at a side of a light-entering surface of the display panel or a light-existing surface thereof.

A method for driving a display device is further provided, applied to drive the display device hereinabove, including: darkening each sub-pixel completely included in the central region of each pixel unit without displaying any color; or lightening each sub-pixel in the central region of each pixel unit when displaying an image, so as to enable each sub-pixel in the central region of each pixel unit to display with a gray level and a brightness required by a user.

According to the multi-view display device and the method for driving the same provided in the present disclosure, based on the Delta pixel array and the pixel array in which the adjacent three sub-pixels are arranged in a form of Chinese character of "品", a multi-view display may be achieved with the cooperation of the optical grating, such that the user may observe from different directions different display contents which are not interfered with each other. In addition, according to the method for the multi-view display device, the sub-pixel completely included in the central region of each pixel unit may be lightened so as to enable the display device to display with different gray levels and brightness.

DETAILED DESCRIPTION

In order to make the objects, the technical solutions and the advantages of the present disclosure more apparent, the present disclosure will be described hereinafter in conjunction with the drawings and embodiments.

Figure 1:
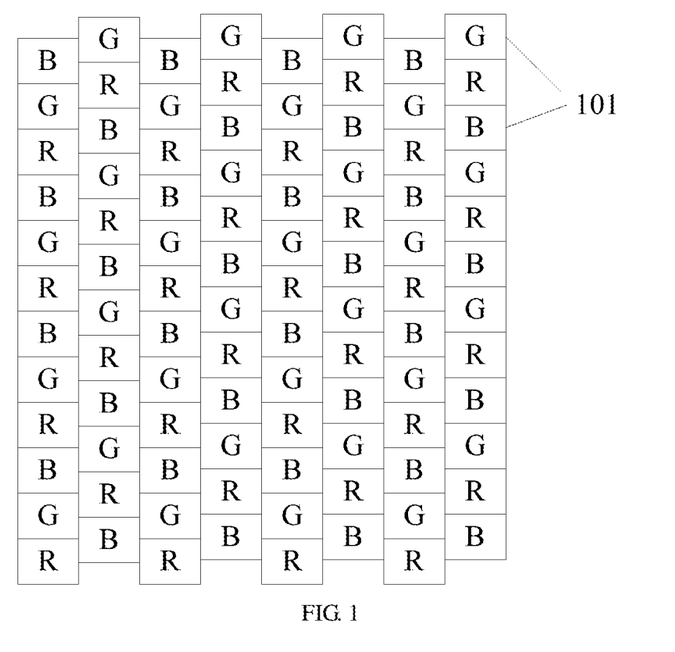
FIG. 1 is a schematic view of a sub-pixel array of a multi-view display device in some embodiments of the present disclosure.

A multi-view display device is provided by the present disclosure, including a display panel and an optical grating. As shown in FIG. 1, the display panel includes an array of a plurality of sub-pixels 101. The sub-pixels 101 in different columns, which are adjacent to each other in a row direction, are of different colors and staggered in a column direction. The array includes a plurality of pixel units. Each of the pixel units includes at least one sub-pixel 101 in each of three adjacent columns of the sub-pixels 101. A middle column in each pixel unit includes more sub-pixels than each of the two side columns. Amounts of the sub-pixels 101 in the two side columns are identical. The middle column includes one more sub-pixel 101 than each of the two side columns. The optical grating includes a light-transmitting region corresponding to a central region of the middle column in each pixel unit.

In some embodiments of the present disclosure, each pixel unit includes the sub-pixels in three adjacent columns of the sub-pixels, and the middle column in each pixel unit includes one more sub-pixels than each of the two side columns. Therefore, each pixel unit includes at least four sub-pixels. The optical grating includes a light-transmitting region corresponding to a position of the central region of each pixel unit. Through a cooperation between the optical grating and the pixel array, each of the sub-pixels other than the sub-pixel in the central region of each pixel unit may be observed from only one direction, and thus it is able to observe different sub-pixels from different directions and observe different images at different positions of the display panel, thereby achieving a multi-view display. The sub-pixels in different columns, which are adjacent to each other in the row direction, are staggered in the column direction, such that the three sub-pixels in any two adjacent columns, which are adjacent to each other, may be arranged in a form of Chinese character of "品", thereby displaying different contents in different directions, and the contents displayed in different directions are not interfered with each other by cooperating with the optical grating. Therefore, the above display panel may be applied in the field of video game. For example, more than one people may play a board game simultaneously such as mahjong or poker by only one display panel, and each of the game players may only observe the contents relevant to himself from the corresponding direction.

In some embodiments of the present disclosure, the pixel unit refers to a set of the sub-pixels corresponding to one optical grating period. The sub-pixels include a blue (B) sub-pixel, a red (R) sub-pixel and a green (G) sub-pixel.

In some embodiments of the present disclosure, the array of the sub-pixels in the display panel is a Delta pixel array. Referring to FIG. 1, the first sub-pixel in the first column from the left side is a blue sub-pixel. The sub-pixel which is in the same column with the blue sub-pixel and adjacent to the blue sub-pixel is the second sub-pixel in the first column from the left side, and it is a green sub-pixel. The second column from the left side is adjacent to the first column. In the second column, the sub-pixel which is proximal to the two sub-pixels hereinabove is the second sub-pixel in the second column. A triangle is formed by the lines connecting central points of the three sub-pixels hereinabove to each other. The line, which connects the central points of the two adjacent sub-pixels in the one column to each other, and the lines, which connect the central point of the sub-pixel in the adjacent column having different colors with and proximal to the two sub-pixels hereinabove to the central points of the two sub-pixels hereinabove respectively, form a triangle, and such pixel arrangement is called a Delta (Δ) pixel array.

In some embodiments of the present disclosure, the device further includes a light-transmitting layer arranged between the display panel and the optical grating.

To be specific, the light-transmitting layer is an optical clear resin (OCR) layer, which is configured to space the optical grating from the display panel, so as to form a suitable parallactic angle.

Figure 2:
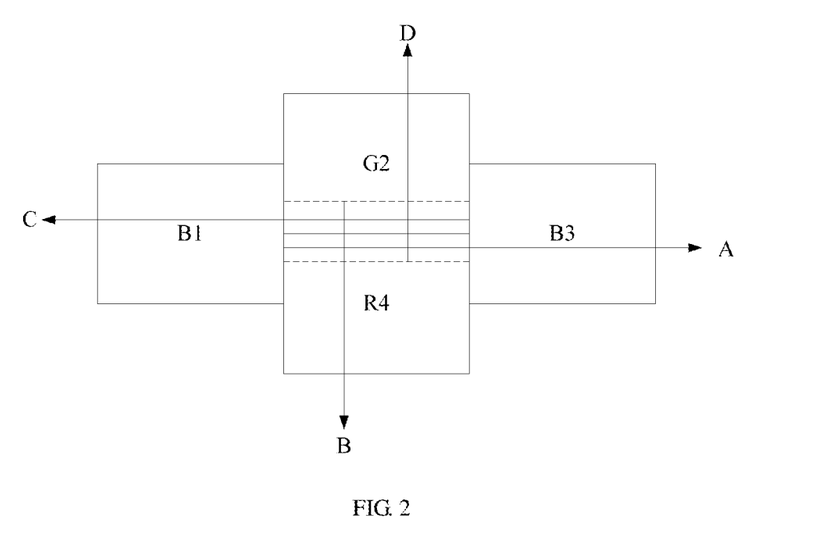
FIG. 2 is a schematic view showing an arrangement of sub-pixels in a pixel unit for a four-view display in some embodiments of the present disclosure.

In some embodiments of the present disclosure, as shown in FIG. 2, the middle column in each pixel unit includes two sub-pixels, and the two side columns therein each includes one sub-pixel. A shape of the optical grating period is adapted to the four sub-pixels in each pixel unit. A size of each light-transmitting region of the optical grating is corresponding to an area of the central region of the middle column in each pixel unit. In the case that each pixel unit includes four sub-pixels, the central region of the middle column includes a part of each of the two sub-pixels in the middle column which is near to a center of the middle column. As shown in the dashed box in FIG. 2, the area of the central region is smaller than an area of one sub-pixel. Furthermore, the area of the central region is not lager than a half of the area of one sub-pixel. A size of each light-transmitting region of the optical grating is adapted to a total size of the sub-pixel in the central region of the middle column in each pixel unit.

Referring to FIG. 2, one optical grating period corresponds to four sub-pixels (i.e., B1, G2, B3 and R4). From a direction A shown in FIG. 2, an observer may observe the sub-pixel B1, while the other sub-pixels are shielded by the optical grating. From a direction B shown in FIG. 2, the observer may observe the sub-pixel G2, while the other sub-pixels are shielded by the optical grating. From a direction C shown in FIG. 2, the observer may observe the sub-pixel B3, while the other sub-pixels are shielded by the optical grating. From a direction D shown in FIG. 2, the observer may observe the sub-pixel R4, while the other sub-pixels are shielded by the optical grating. In each pixel unit, only one sub-pixel may be observed from the corresponding direction. In some embodiments of the present disclosure, different sub-pixels may be observed from at most four directions. Similarly, each pixel region in the display panel is as described above, so the user may observe different images from different directions. The user may observe different images from at most four directions relative to the display panel. Therefore, in some embodiments of the present disclosure, there exist four viewing angles for each pixel unit, thereby displaying four different images within four viewing angle ranges.

In the case that each pixel unit includes four sub-pixels, the size of the light-transmitting region of the optical grating may be smaller than the area of one sub-pixel, which may be a half of the area of one sub-pixel in specific, as shown in the dashed box in FIG. 2.

In some embodiments of the present disclosure, the middle column in each pixel unit includes at least three sub-pixels. The central region of the middle column is a region corresponding to the sub-pixel between the sub-pixels at two ends of the middle column. The size of the light-transmitting region of the optical grating is adapted to the total size of the sub-pixel in the central region of the middle column in each pixel unit.

Referring to FIG. 1, in some embodiments of the present disclosure, the top two sub-pixels 101 in the first column from the left side, the top three sub-pixels 101 in the second column from the left side and the top two sub-pixels 101 in the third column from the left side form a pixel unit. The region corresponding to the sub-pixel between the sub-pixels at two ends of the middle column is taken as the central region, and then the size of the light-transmitting region of the optical grating is identical to the size of the central region, i.e., the size of one sub-pixel. The sub-pixel in the central region of the pixel unit is not shielded by the optical grating, so the sub-pixel in the central region of the pixel unit may be observed from any direction, while the other sub-pixels may be shielded by the optical grating.

Figure 3A:
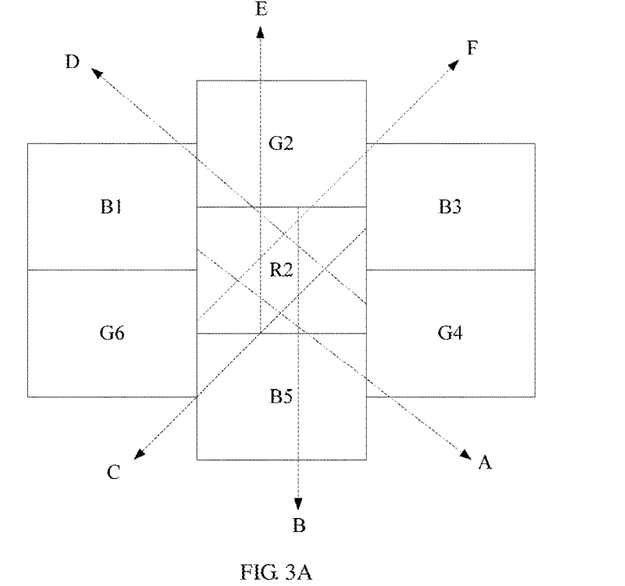
FIG. 3A is a schematic view showing an arrangement of sub-pixels in a pixel unit for a six-view display in some embodiments of the present disclosure.

FIG. 3A is an enlarged view of the pixel unit shown in FIG. 1 which is formed by the top two sub-pixels 101 in the first column from the left side, the top three sub-pixels 101 in the second column from the left side and the top two sub-pixels 101 in the third column. The size of the light-transmitting region of the optical grating is adapted to the size of one sub-pixel. A total area of an assembled optical grating is substantially identical to a total area of the display panel, and a position of the light-transmitting region of the optical grating is corresponding to the central region of each pixel unit. Only one sub-pixel surrounding the central region may be observed from a corresponding direction relative to the pixel unit, while the other sub-pixels surrounding the central region are shielded from the corresponding direction.

For example, as shown in FIG. 3A, the sub-pixel B1 may be observed at a position A, while the other sub-pixels surrounding the central region are shielded. The sub-pixel G2 may be observed at a position B, while the other sub-pixels surrounding the central region are shielded. The sub-pixel B3 may be observed at a position C, while the other sub-pixels surrounding the central region are shielded. The sub-pixel G4 may be observed at a position D, while the other sub-pixels surrounding the central region are shielded. The sub-pixel B5 may be observed at a position E, while the other sub-pixels surrounding the central region are shielded. The sub-pixel G6 may be observed at a position F, while the other sub-pixels surrounding the central region are shielded. Therefore, the user may observe only one sub-pixel surrounding the central region at each corresponding position and thus observe six different sub-pixels at six different positions. Therefore, each of the six sub-pixels surrounding the central region in the pixel unit may be observed by the user at one corresponding position relative to the display panel which is opposite to the sub-pixel, and thus the user may observe six different images from six different directions relative to the display panel. The user may observe different images from at most six different directions relative to the display panel. Therefore, in some embodiments of the present disclosure, each pixel unit has six viewing angle ranges within which the display device may display six different images. When displaying an image, the sub-pixels surrounding the central region of one pixel unit form a RGB unit together with the sub-pixels of the other two pixel units.

Figure 3B:
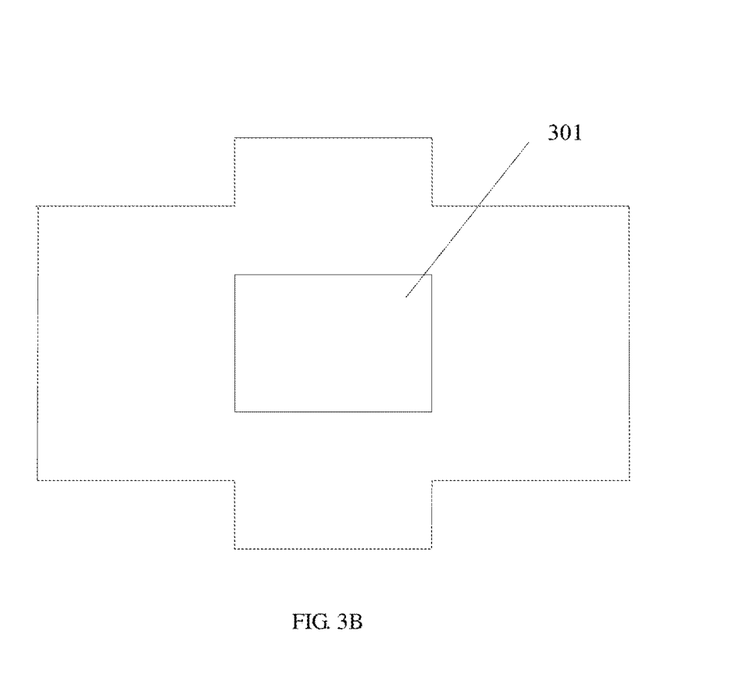
FIG. 3B is a schematic view of an optical grating period of an optical grating for a six-view display in some embodiments of the present disclosure.

FIG. 3B is a schematic view of an optical grating period corresponding to the six-view pixel unit shown in FIG. 3A, where the central region is a light-transmitting region 301.

The multi-view display device in some embodiments of the present disclosure may further achieve an eight-view display or even a ten-view display.

Referring to FIG. 1, the top three sub-pixels 101 in the first column from the left side, the top four sub-pixels 101 in the second column from the left side of and the top three sub-pixels 101 in the third column from the left side form a pixel unit. In such case, one pixel unit includes ten sub-pixels 101, and there exist two sub-pixels 101 between the sub-pixels at two ends of the middle column respectively, and then a region corresponding to the two sub-pixels 101 is taken as a central region of the pixel unit. A size of each light-transmitting region of the optical grating is adapted to a total size of the two sub-pixels 101 at the middle of the middle column.

Figure 4:
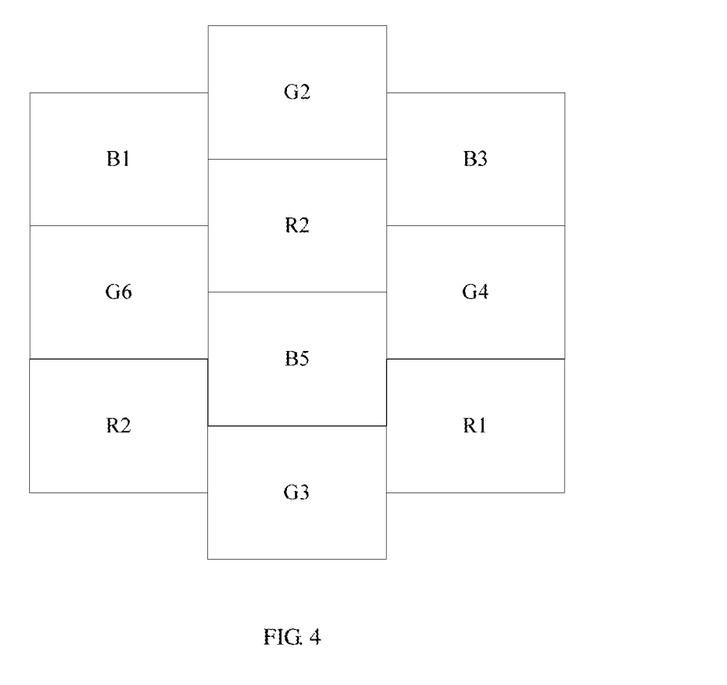
FIG. 4 is a schematic view showing an arrangement of sub-pixels in a pixel unit for an eight-view display in some embodiments of the present disclosure.

FIG. 4 is an enlarged view of the pixel unit shown in FIG. 1 which is formed by the top three sub-pixels 101 in the first column from the left side, the top four sub-pixels 101 in the second column from the left side and the top three sub-pixels 101 in the third column from the left side. The size of the light-transmitting region of the optical grating is adapted to the total size of two sub-pixels. Each sub-pixel surrounding the central region may only be observed at one corresponding position relative to the pixel unit, while the other sub-pixels surrounding the central region are shielded. The principle of the eight-view display is similar to that of the six-view display. There exist eight sub-pixels surrounding the central region, and each of the eight sub-pixels may only be observed from one corresponding direction relative to the pixel unit. Therefore, each of the eight sub-pixels surrounding the central region in the pixel unit may be observed by the user at one corresponding position relative to the display panel which is opposite to the sub-pixel, and thus the user may observe eight different images from eight different directions relative to the display panel. The user may observe different images from at most eight different directions relative to the display panel. Therefore, in some embodiments of the present disclosure, each pixel unit has eight viewing angle ranges within which the display device may display eight different images.

In the similar way, when there exists five or six sub-pixels . . . in the middle column of each pixel unit, a ten-view display or a twelve-view display . . . may be achieved. Except for the case that there exists two sub-pixels in the middle column, the central region of the pixel unit corresponds to the sub-pixel or the sub-pixels between the sub-pixels at two ends of the middle column respectively. For example, when there exists three sub-pixels in the middle column, the central region of the pixel unit corresponds to the sub-pixel in the middle of the middle column. When there exists four sub-pixels in the middle column, the central region of the pixel unit corresponds to the two sub-pixels in the middle of the middle column. When there exists five sub-pixels in the middle column, the central region of the pixel unit corresponds to the three sub-pixels in the middle of the middle column. When there exists six sub-pixels in the middle column, the central region of the pixel unit corresponds to the four sub-pixels in the middle of the middle column. The rest can be done in the same manner.

When there exists five sub-pixels in the middle column of each pixel unit, the central region of the pixel unit corresponds to the three sub-pixels in the middle of the middle column. There exists ten sub-pixels surrounding the central region, including two sub-pixels at two ends of the middle column and eight sub-pixels at the two adjacent columns. Therefore, each of the ten sub-pixels surrounding the central region may only be observed from one corresponding direction relative to the light-transmitting region of the optical grating. Ten different sub-pixels may be observed from ten different directions relative to the light-transmitting region of the optical grating. The user may observe ten different images from ten different directions relative to the display panel, thereby achieving the ten-view display.

In some embodiments of the present disclosure, a display with more odd views may be achieved, and a principle thereof is similar to that of the six-view display, the eight-view display or the ten-view display.

In some embodiments of the present disclosure, the optical grating is a barrier optical grating, an active barrier optical grating, a lenticular optical grating or an electronic light control (ELC) optical grating.

In some embodiments of the present disclosure, the sub-pixels in different columns, which are adjacent to each other in the row direction, are staggered in the column direction by two thirds to one third of one sub-pixel.

In some embodiments of the present disclosure, the sub-pixels in different columns, which are adjacent to each other in the row direction, are staggered in the column direction by a half of one sub-pixel, as shown in FIG. 1.

In some embodiments of the present disclosure, arrangements of the sub-pixels in odd-numbered columns are identical to each other and arrangements of the sub-pixels in even-numbered columns are identical to each other.

Referring to FIG. 1, the sub-pixels in each odd-numbered column are arranged in a sequence of B, R, B, R . . . , and the sub-pixels in each even-numbered column are arranged in a sequence of G, R, B, R, B . . . .

In some embodiments of the present disclosure, the sub-pixels in each odd-numbered column are arranged in a sequence of R, G, B, R, G, B . . . , and the sub-pixels in each even-numbered column are arranged in a sequence of G, B, R, G, B, R . . . .

In some embodiments of the present disclosure, the light-transmitting region is rectangular, and a size thereof is adapted to a size of the sub-pixel in the central region of the middle column in each pixel unit. In some embodiments of the present disclosure, a shape of the light-transmitting region may further be a rounded rectangle or other shapes.

In some embodiments of the present disclosure, the optical grating is arranged at a side of a light-entering surface of the display panel or a light-existing surface thereof.

Figure 5:
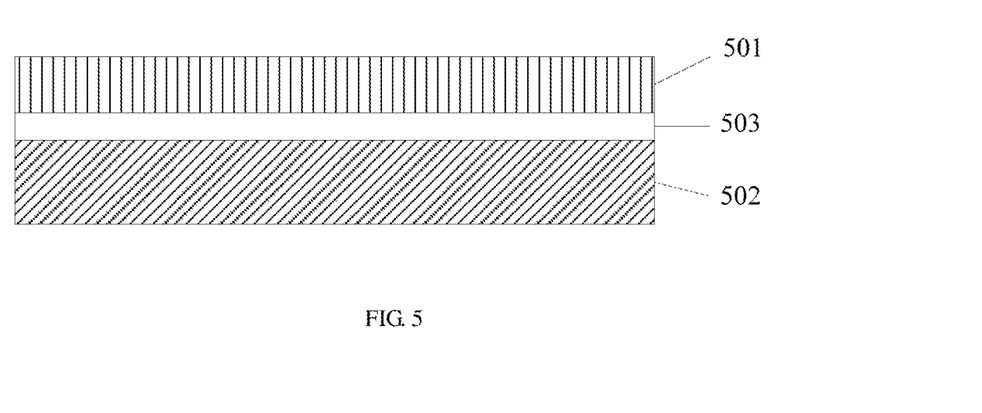
FIG. 5 is a schematic view of a display device in some embodiments of the present disclosure.

FIG. 5 is a schematic view of a display device with an optical grating arranged at a side of a light-existing surface of the display panel. As shown in FIG. 5, an optical grating 501 is arranged at a light-existing side of the display panel 502. A transparent adhesive layer 503 is arranged between the optical grating 501 and the display panel 502, which is configured to space the optical grating 501 from the display panel 502. The adhesive layer 503 may be an optical transparent adhesive layer.

A method for driving the display device in some embodiments of the present disclosure is provided, including:
darkening each sub-pixel completely included in the central region of each pixel unit without displaying any color; or
lightening each sub-pixel completely included in the central region of each pixel unit when displaying an image, so as to enable the sub-pixel in the central region of each pixel unit to display with a gray level and a brightness required by a user.

Figure 6:
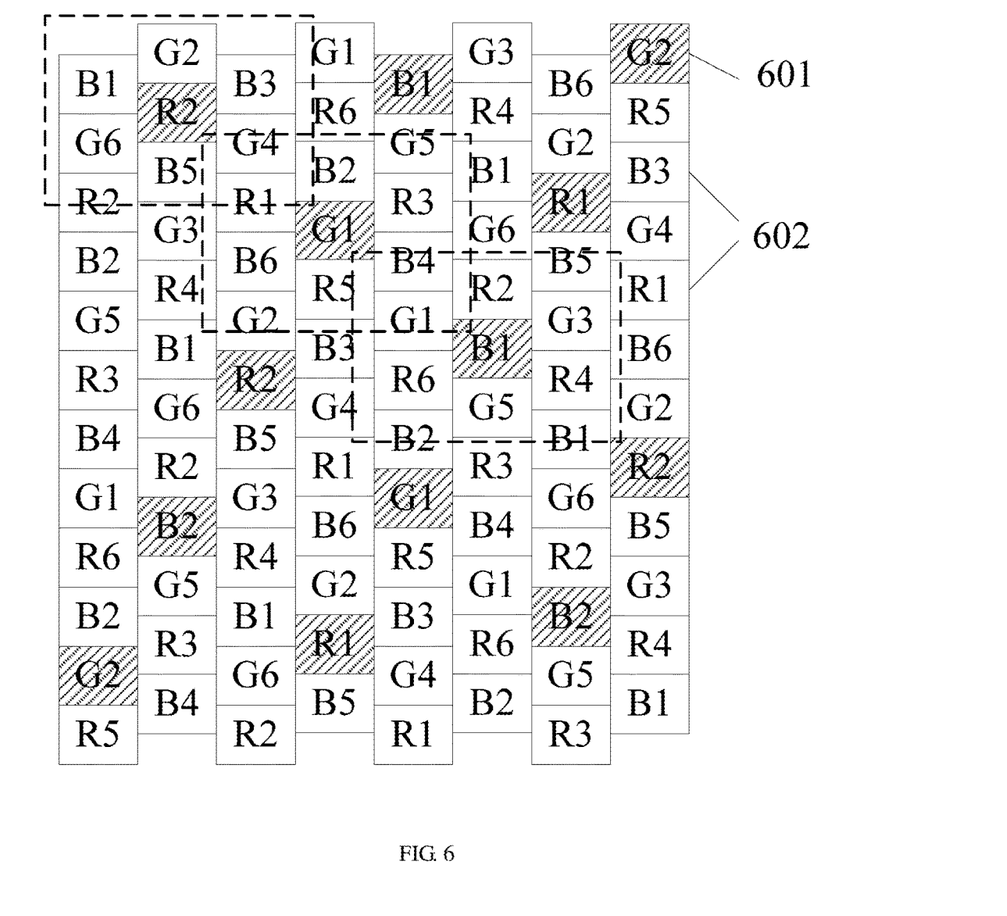
FIG. 6 is a schematic view showing the sub-pixels in each central region of a pixel array for a six-view display in some embodiments of the present disclosure.

As shown in FIG. 6, each pixel unit includes seven sub-pixels, and the central region thereof includes a complete sub-pixel 601. In such case, the complete sub-pixel in the central region of each pixel unit is darkened without displaying any color, and then the user may only observe the sub-pixels 602 surrounding the central region of each pixel unit from different directions, and each of the six sub-pixels 602 surrounding the central region of each pixel unit may only be observed by the user from one corresponding direction. The sub-pixels 601, which are shadowed in FIG. 6, are the sub-pixels in the central regions of the six-view display panel. Numbers 1-6 represent the numbers of viewing angles. The sub-pixels with the same number may be observed from the same direction.

When display an image, the sub-pixel in one pixel unit which may be observed from a direction may form a RGB display unit together with two sub-pixels in the adjacent two pixel units respectively which may be observed from the identical direction. Referring to FIG. 6, the sub-pixels in the central regions of the three pixel units in the dashed boxes are R2, G1 and B1 respectively. In the pixel unit formed by the top three sub-pixels in the first column from the left side, the top four sub-pixels in the second column from the left side and the top three sub-pixels in the third column from the left side, from a direction from which the sub-pixel B1 may be observed, the sub-pixel R1 in the pixel unit in the dashed box of which the central region is G1 and the sub-pixel G1 in the pixel unit in the dashed box of which the central region is B1 may also be observed. Therefore, the three sub-pixels in the three pixel units respectively, which may be observed from the identical direction, may form a RGB display unit.

In the case that each pixel unit only includes four sub-pixels, an area of the central region is smaller than an area of one sub-pixel, and the central region only includes a part of each of the two sub-pixels in the middle column. In such case, none of the sub-pixels in each pixel unit is darkened when displaying an image.

In some embodiments of the present disclosure, the complete sub-pixel in the central region of each pixel unit is lightened when displaying an image, so as to enable the sub-pixel in the central region of each pixel unit to display with a gray level and a brightness required by a user.

In the case of the six-view display, there exists only one complete sub-pixel in the central region of each pixel unit. When lightening this sub-pixel, this sub-pixel is combined with two sub-pixels with different colors from this sub-pixel in the central regions of the adjacent two pixel units so as to form a RGB display unit.

In some embodiments of the present disclosure, the sub-pixels with the same color in the central regions of all the pixel units of the entire display panel may be displayed with the same brightness.

From the above, according to the multi-view display device and the method for driving the same, based on the Delta pixel array and the pixel array in which the adjacent three sub-pixels are arranged in a form of Chinese character of "品", a multi-view display may be achieved with the cooperation of the optical grating, such that the user may observe from different directions different display contents which are not interfered with each other. In addition, according to the method for the multi-view display device, the complete sub-pixel in the central region of each pixel unit may be lightened so as to enable the display device to display with different gray levels and brightness.

It should be known that the above embodiments are for illustrative purposes only, but shall not be used to limit the scope of the present disclosure. The embodiments of the present disclosure and the features therein may be combined without any conflict there between.

Obviously, a person skilled in the art may make further modifications and improvements without departing from the principle of the present disclosure, and these modifications and improvements shall also fall within the scope of the present disclosure.

What is claimed is:
1. A multi-view display device, comprising:
a display panel; and
an optical grating;
wherein the display panel comprises an array of a plurality of sub-pixels, and the sub-pixels in different col- umns, which are adjacent to each other in a row direction, are of different colors and staggered in a column direction;

wherein the array comprises a plurality of pixel units, and each of the pixel units comprises at least one sub-pixel in each of three adjacent columns of the sub-pixels;

wherein in each pixel unit, a middle column comprises more sub-pixels than each of two side columns, amounts of the sub-pixels in the two side columns are identical, and the middle column comprises one more sub-pixel than each of the two side columns; and wherein the optical grating comprises a light-transmitting region corresponding to a central region of the middle column in each pixel unit, wherein in each pixel unit, the middle column comprises two sub-pixels, and the central region of the middle column comprises a part of each of the two sub-pixels in the middle column which is near to a center of the middle column, an area of the central region is smaller than an area of one sub-pixel; and a size of the light-transmitting region of the optical grating is adapted to a total size of the sub-pixels in the central region of the middle column in each pixel unit.

2. The device according to claim 1, further comprises a light-transmitting layer between the display panel and the optical grating.

3. The device according to claim 1, wherein in each pixel unit, the middle column comprises at least three sub-pixels, and the central region of the middle column is a region corresponding to the sub-pixel between the sub-pixels at two ends of the middle column; and a size of the light-transmitting region of the optical grating is adapted to a total size of the sub-pixel in the central region of the middle column in each pixel unit.

4. The device according to claim 1, wherein the optical grating is a barrier optical grating, an active barrier optical grating, a lenticular optical grating or an electronic light control optical grating.

5. The device according to claim 1, wherein the sub-pixels in different columns, which are adjacent to each other in the row direction, are staggered in the column direction by two thirds to one third of one sub-pixel.

6. The device according to claim 1, wherein in the array of the sub-pixels, arrangements of the sub-pixels in odd-numbered columns are identical to each other and arrangements of the sub-pixels in even-numbered columns are identical to each other.

7. The device according to claim 1, wherein the light-transmitting region is rectangular, and a size thereof is adapted to a size of the sub-pixel in the central region of the middle column in each pixel unit.

8. The device according to claim 1, wherein the optical grating is at a side of a light-entering surface of the display panel or a light-existing surface thereof.

9. A method for driving the display device according to claim 1, comprising:

darkening each sub-pixel completely included in the central region of each pixel unit without displaying any color; or lightening each sub-pixel in the central region of each pixel unit when displaying an image, so as to enable each sub-pixel in the central region of each pixel unit to display with a gray level and a brightness required by a user.

10. The method according to claim 9, wherein the display device further comprises a light-transmitting layer between the display panel and the optical grating.

11. The method according to claim 9, wherein in each pixel unit, the middle column comprises at least three sub-pixels, and the central region of the middle column is a region corresponding to the sub-pixel between the sub-pixels at two ends of the middle column;

a size of the light-transmitting region of the optical grating is adapted to a total size of the sub-pixel in the central region of the middle column in each pixel unit.

12. The method according to claim 9, wherein the optical grating is a barrier optical grating, an active barrier optical grating, a lenticular optical grating or an electronic light control optical grating.

13. The method according to claim 9, wherein the sub-pixels in different columns, which are adjacent to each other in the row direction, are staggered in the column direction by two thirds to one third of one sub-pixel.

14. The method according to claim 9, wherein in the array of the sub-pixels, arrangements of the sub-pixels in odd-numbered columns are identical to each other and arrangements of the sub-pixels in even-numbered columns are identical to each other.

15. The method according to claim 9, wherein the light-transmitting region is rectangular, and a size thereof is adapted to a size of the sub-pixel in the central region of the middle column in each pixel unit.

16. The method according to claim 9, wherein the optical grating is at a side of a light-entering surface of the display panel or a light-existing surface thereof.

* * * * *